United States Patent
Hickey

(10) Patent No.: US 6,266,465 B1
(45) Date of Patent: Jul. 24, 2001

(54) ANGLED OPTIC FIBER UNIONS AND JUNCTIONS FOR OPTIC FIBER CONDUITS

(75) Inventor: Kurt A. Hickey, Humble, TX (US)

(73) Assignee: Baker Huges Incorporated, Houston, TX (US)

( * ) Notice: Subject to any disclaimer, the term of this patent is extended or adjusted under 35 U.S.C. 154(b) by 0 days.

(21) Appl. No.: 09/398,860

(22) Filed: Sep. 20, 1999

Related U.S. Application Data

(60) Provisional application No. 60/101,418, filed on Sep. 22, 1998.

(51) Int. Cl.⁷ .................................... G02B 6/26
(52) U.S. Cl. .................. 385/45; 385/24; 385/134; 65/406
(58) Field of Search ............... 385/45, 134, 138, 385/46, 135, 24; 65/406, 407

(56) References Cited

U.S. PATENT DOCUMENTS

| | | | |
|---|---|---|---|
| 4,142,877 | 3/1979 | Auracher et al. | 65/406 |
| 4,682,843 | 7/1987 | Mahlein et al. | 385/45 |
| 4,747,654 | * 5/1988 | Yi-Yan | 385/45 |
| 4,822,127 | 4/1989 | Kamiya et al. | 385/46 |
| 5,333,219 | 7/1994 | Kuznetsov | 385/45 |
| 5,781,678 | 7/1998 | Sano et al. | 385/45 |
| 5,917,973 | * 6/1999 | Iwasaki | 385/45 |

FOREIGN PATENT DOCUMENTS

| | | |
|---|---|---|
| 2 283 373 | 5/1995 | (GB) . |
| 2 292 018 | 2/1996 | (GB) . |
| 2 303 973 | 3/1997 | (GB) . |
| 63-200104 | 8/1988 | (JP) . |
| WO 94-23320 | 10/1994 | (WO) . |

* cited by examiner

Primary Examiner—Loha Ben
(74) Attorney, Agent, or Firm—Cantor Colburn LLP

(57) ABSTRACT

Angled unions and junctions for conduits in which fiber optic conductors are run are provided for downhole oil drilling, injection and production operations. The unions and junctions provide high pressure and adverse condition protection for the optic fibers while providing an acceptable bend radius.

10 Claims, 2 Drawing Sheets

ANGLED OPTIC FIBER UNIONS AND JUNCTIONS FOR OPTIC FIBER CONDUITS

This application claims the benefit of an earlier filing date from U.S. Ser. No. 60/101,418, filed Sep. 22, 1998, the entire contents of which is incorporated herein by reference.

BACKGROUND OF THE INVENTION

1. Field of the Invention

The invention relates to the oil field industry. More particularly, the invention relates to fiber optics, conduits and junctions for use in the downhole environment.

2. Prior Art

In recent years fiber optic technology has been integrated into many different fields of endeavor particularly with respect to communicating information and power. Gains can be had on both fronts by employing optic fibers instead of wire conductors in many situations.

As one skilled in the use of optic fibers will recognize, the fibers are delicate and require protection to work reliably. For this reason it has been very difficult to employ optic fibers in the typically harsh downhole oil well environment. Temperature, pressure, vibration, chemicals, etc. are all common conditions downhole and are all deleterious to virtually all materials but particularly so with respect to delicate optic fibers.

Optic fibers have nevertheless been successfully employed in the downhole environment when properly clad and when run through empty hydraulic control conduit systems. This use has been successful for straight runs. The conduit protects the fiber from all of the aforementioned conditions and reliable fiber optic control has been achieved. The limited (to straight runs) downhole optic fiber usage has been very beneficial to the industry but remains limited, in the knowledge of the industry, since until this invention there has been no way to successfully split fiber off a main run to go in another direction. Running fiber in a primary wellbore and then splitting off some of it for a lateral has never been successfully attempted due to breakage of the fibers and vibration coupling. Existing hydraulic conduit "T" fittings when employed to split off fiber cause the fiber to break from contact with corners and tight bend radiuses and because they suffer vibration damage from contacting the walls of the conduit where vibration from the environment is strongest with respect to the space defined by the conduit.

SUMMARY OF THE INVENTION

The above-identified drawbacks of the prior art are overcome or alleviated by the angled optic fiber conduit unions and junctions of the invention.

Appropriately angled unions and junctions enable the heretofore contraindicated practice of splitting optic fibers off from the main conduit in the downhole environment to be directed to distinct places such as lateral boreholes or to other tools. Creating unions and junctions that maintain a minimum bend radius and to avoid significant corner contact pressure makes optic fiber distribution feasible and reliable in the downhole environment.

Although it is possible to split off optic fibers with conventional hydraulic conduit unions and junctions the fiber bend radius is relatively small, corner contact results and the fiber is pressed against one of the walls of the hydraulic conduit causing greater vibration coupling into the fiber. While the optic fibers can be made to work in this condition in the factory, the downhole environment in which these tools are employed is an environment of high pressure, high temperature and high vibration. These conditions in combination with the relatively small bend radius and the fiber being pressed against the conduit sidewall, thus coupling the fiber to vibration in the conduit, cause failure.

By carefully matching a bend in the union or junction to avoid too small a bend radius and consequently avoiding fiber pressure against the wall of the conduit, failure of the fiber occurs less often while allowing the use of optic fibers at all locations in a well even if the well is a multilateral well. For purposes of clarity, the bias contemplated herein is that supplied by the fiber itself in the bent condition.

The invention greatly expands the capability of manufacturers to build downhole systems with fiber optic communications.

In addition to bend radius the unions of the invention as well as the entirety of the fiber optic conduit is pressure sealed. This may be accomplished by any known sealing method that prevents ingress or egress of fluid. By sealing the conduit a protective fluid for the fiber optic could be employed within the conduit or it can contain simply air or even a vacuum and still prevent wellbore fluids from gaining entry thereto.

BRIEF DESCRIPTION OF THE DRAWINGS

Referring now to the drawings wherein like elements are numbered alike in the several FIGURES.

DETAILED DESCRIPTION OF THE PREFERRED INVENTION

Figure 1:
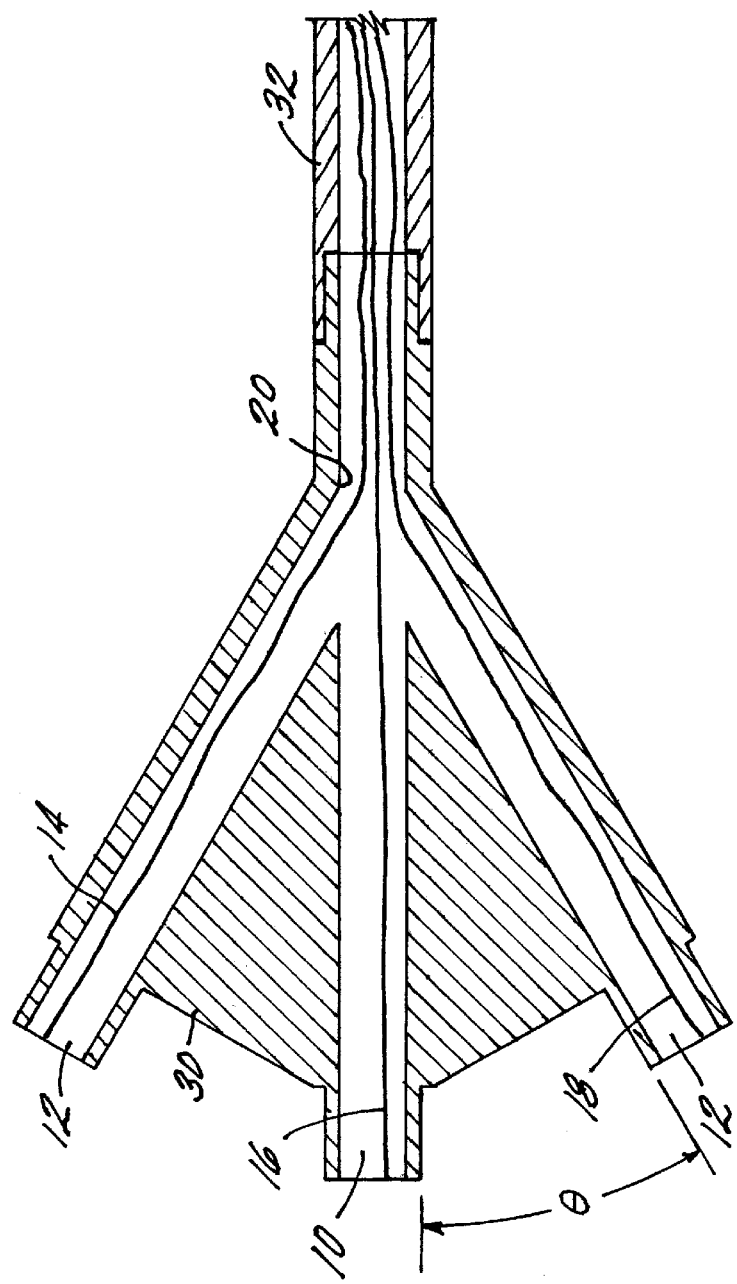
FIG. 1 is a schematic cross section view of a junction of the invention.
Figure 2:
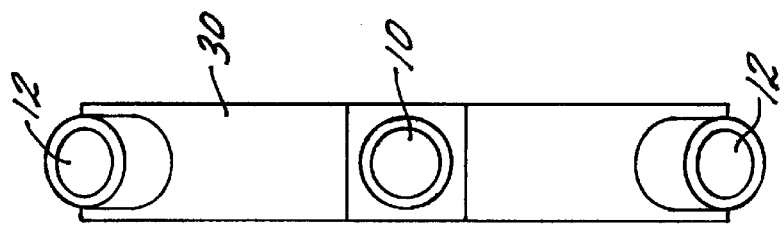
FIG. 2 is an end view of the junction in FIG. 1.

Referring to FIGS. 1 and 2, a schematic cross section view of a three-way junction of the invention including primary conduit 10 and branch conduits 12. Optic fibers, 14, 16 and 18 are visible, one in each conduit. The branch conduits are joined preferably by web 30 or by an equivalent support structure to provide sufficient strength. While the illustrations show both of the branch conduits 12 extending in the same plane it is within the scope of the invention to have each of the two branch conduits exist in different planes at a multiplicity of angles to one another. For example, viewing the drawing of FIG. 2, one of the branches is at the twelve O'clock position and one of the branches is at the six O'clock position. These are in the same plane. If however, the second of the branches was at, for instance, the three O'clock position, the two branch conduits would be in different planes.

Figure 3:
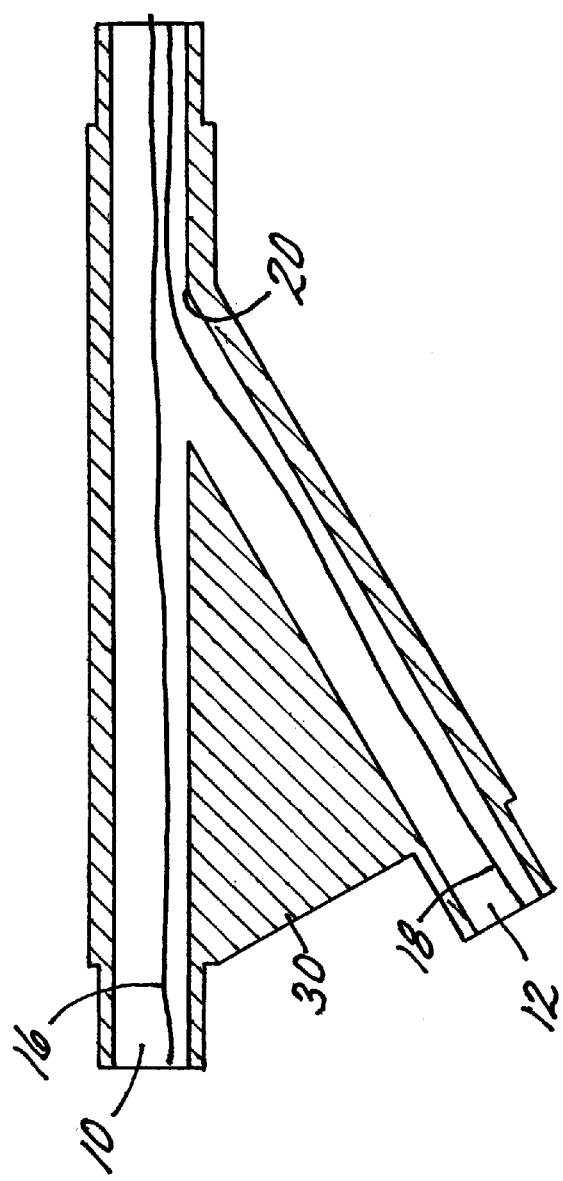
FIG. 3 is a schematic cross section view of a two-way junction of the invention.
Figure 4:
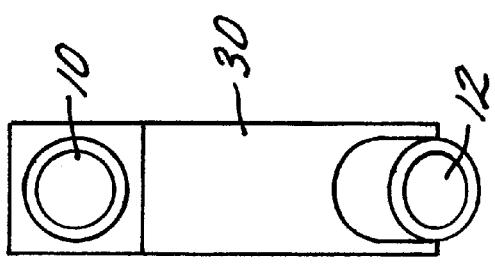
FIG. 4 is an end view of the junction of FIG. 3.

Referring to FIGS. 3 and 4, a two-way junction is illustrated. Numerals employed are identical to FIGS. 1 and 2 due to equivalence of the parts. Each embodiment is connectable to another conduit 32 as illustrated only in FIG. 1 in known ways.

A preferable angle of departure for branch conduit 12 is illustrated as angle θ and is preferably in the range of about 10 to about 80 degrees and preferably less than 90 degrees.

Angle θ, in addition ensures that fiber 16 does not bias itself into the wall of the conduit 12 (with its bias to be straight). Because the fiber 16 when placed in the invention does not strongly contact conduit 12, coupling of the vibration in the conduit from downhole operations is not well transmitted to fiber 16. Fiber 16 therefore experiences far less vibration than would have been the case in the prior art conduits. Moreover, since contact with the corner 20 is reduced due to angled departure, the fiber is not as likely to break in this location.

In a preferred embodiment of the invention, the fiber conduit is pressure sealed at all joints thereof to insure complete fluid separation from internal to the conduit and external to the conduit. Seals at joints of the unions and other conduit sections may be tapered thread seals other metal-to-metal seals, o-rings, teflon seals, etc. The seals preferably will withstand up to 10,000 psi or even higher so as to be sufficient to withstand downhole pressures.

Optic fibers, because of the invention, are now available for use in all areas of a well without premature workover. Optic fibers provide significant advantage as known to the art and the art therefore is greatly benefitted.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An optic fiber conduit junction comprising:

a primary conduit having an axial passage therein; and a branch conduit extending from said primary conduit and having an axial passage which intersects said primary conduit axial passage, said branch conduit axial passage creating an angle of intersection with said primary conduit axis passage of about less than 90 degrees.

2. An optic fiber conduit junction as claimed in claim 1 wherein said junction includes ends which are pressure sealably securable to other conduit sections.

3. An optic fiber downhole distribution system comprising:

at least one optical fiber;

at least one length of first conduit for said optical fiber;

at least one junction connected to said first conduit, said junction having at least one axial passage extending therethrough and at least one second passage intersecting said at least one axial passage at an angle θ of about less than 90 degrees.

4. An optic fiber downhole distribution system as claimed in claim 3 wherein said at least one optical fiber is a plurality of optic and fibers distributed in said first passage and said second passage.

5. An optic fiber downhole distribution system as claimed in claim 4 wherein said at least one junction is a plurality of junctions each receiving distributed fibers.

6. An optic fiber downhole distribution system as claimed in claim 3 wherein said system is pressure sealed to prevent fluid ingress or egress from said system at connections between said at least one first conduit and said at least one junction.

7. An optic fiber conduit junction comprising:

a housing;

a primary opening through said housing;

a secondary opening extending from an edge of said housing into said housing to intersect with said primary opening, said secondary opening forming an acute angle with said primary opening.

8. An optic fiber conduit junction as claimed in claim 7 further including a tertiary opening forming an acute angle with said primary opening.

9. An optic fiber conduit junction as claimed in claim 8 wherein said secondary opening and said tertiary opening each form a plane with said primary opening and wherein the planes formed are intersecting.

10. An optic fiber conduit junction as claimed in claim 7 wherein said junction includes ends which are pressure sealably securable to other conduit sections.

* * * * *